(12) United States Patent
Lee (10) Patent No.: US 8,043,702 B2
(45) Date of Patent: Oct. 25, 2011

(54) MAGNETIC NANOPARTICLES SURFACE-MODIFIED WITH DITHIOCARBAMATE

(75) Inventor: Jin-Kyu Lee, Seoul (KR)

(73) Assignee: Seoul National University Research & Development Business Foundation (SNU R&DB Foundation), Seoul (KR)

( * ) Notice: Subject to any disclaimer, the term of this patent is extended or adjusted under 35 U.S.C. 154(b) by 570 days.

(21) Appl. No.: 12/197,568

(22) Filed: Aug. 25, 2008

(65) Prior Publication Data
US 2010/0047578 A1   Feb. 25, 2010

(51) Int. Cl.
*B32B 5/16* (2006.01)
*B05D 7/00* (2006.01)
*C07C 333/18* (2006.01)

(52) U.S. Cl. ........ 428/403; 427/215; 427/216; 427/220; 564/17; 564/74; 564/75; 564/100; 977/773; 977/838

(58) Field of Classification Search .................. 428/403; 427/215, 216, 220; 977/773, 838; 564/17, 564/100
See application file for complete search history.

(56) References Cited

U.S. PATENT DOCUMENTS

| | | | |
|---|---|---|---|
| 5,387,365 A | | 2/1995 | Moriya et al. |
| 7,803,568 B2 * | | 9/2010 | Wei et al. ............... 435/7.92 |
| 7,923,576 B2 * | | 4/2011 | Wessels et al. ............. 564/155 |
| 2002/0072069 A1 | | 6/2002 | Ford et al. |
| 2002/0127756 A1 * | | 9/2002 | Wessels et al. ............... 438/39 |
| 2006/0040822 A1 * | | 2/2006 | Shveima et al. ............. 502/103 |
| 2006/0113530 A1 * | | 6/2006 | Wessels et al. ............... 257/40 |
| 2006/0246482 A1 * | | 11/2006 | Ford et al. ..................... 435/6 |

FOREIGN PATENT DOCUMENTS

EP   1 215 205 B1 * 11/2007
WO   WO 03/072247   9/2003

OTHER PUBLICATIONS

McCubbin et al, Dithiocarbamate-Functionalized Dendrimers as Ligands for Metal Complexes, Inorg. Chem. (1998), 37, 3753-3758.*
F.Z. Dorwald, Ch. 2. *Supports for Solid-Phase Organic Reactions* in "Organic Synthesis on Soli Phase: Supports, Linkers, Reactions," Wiely-VCH Verlag GmbH, Weinheim, (2000).
Peptide synthesis: http://en.wikipedia.org/wiki/Peptide_synthesis, (Nov. 21, 2008).
Yoon et al., "Magnetic Nanoparticles as a Catalyst Vehicle for Simple and Easy Recycling," *New J. Chem.*, vol. 27, pp. 227-229, (2003).

(Continued)

*Primary Examiner* — Hoa (Holly) Le
(74) *Attorney, Agent, or Firm* — Foley & Lardner LLP (57) ABSTRACT

A surface-modified, magnetic nanoparticle has one or more multi-dentate ligands bound to a surface of a magnetic nanoparticle. The one or more multi-dentate ligands are bound to the surface of the magnetic nanoparticle through one or more dithiocarbamate groups. The one or more multi-dentate ligands may be a compound of Formula II:

$$R_2NCH_2[CH_2NR'CH_2]_m[CH_2N(CS_2^-)CH_2]_q[CH_2NHCH_2]_rCH_2NR''_2 \quad (II)$$

where each R, R', and R" are independently H, a branched ethyleneimine unit, an unsubstituted or substituted alkyl, an unsubstituted or substituted alkenyl, or an unsubstituted or substituted aryl; and n is an integer from 1 to about 50.

16 Claims, 3 Drawing Sheets

1 day

10 days 20 days 30 days

OTHER PUBLICATIONS

Yoon et al., "Rh-based Olefin hydroformylation Catalysts and the Change of Their Catalytic Activity Depending on the Size of Immobilizing Supporters," *Inorganica Chimica Acta*, vol. 345, pp. 228-234, (2003).

Dubois et al., "A Versatile Strategy for Quantum Dot Ligand Exchange," *J. Am. Chem. Soc.*, vol. 129, No. 3, pp. 482-483, (2007).

Chen et al., "Synthesis of Sperical FePd and CoPt Nanoparticles," *J. Appl. Phys.*, vol. 91, No. 10, pp 8477-8479, (May 15, 2002).

Taeghwan Hyeon, "Chemical Synthesis of Magnetic Nanoparticles," *Chem. Commun.*, pp. 927-934, (2003).

Sun et al., "Synthesis of Monodisperse Cobalt Nanocrystals and Their Assembly into Magnetic Superlattices (invited)," *J. Appl. Phys.*, vol. 85, No. 8, pp. 4325-4330, (Apr. 15, 1999).

Sun et al., "Monodisperse FePt Nanoparticles and Ferromagnetic FePt Nanocrystal Superlattices," *Science*, vol. 287, pp. 1989-1992, (Mar. 17, 2000).

Seo et al., "Size-Dependent Magnetic Properties of Colloidal $Mn_3O_4$ and MnO Nanoparticles," *Angew Chem. Int. Ed.*, vol. 43, pp. 1115-1117, (2004).

Sousa, et al., "New Electric Double-Layered Magnetic Fluids Based on Copper, Nickel, and Zinc Ferrite Nanostructures," *J. Phys. Chem. B*, vol. 105, No. 6, pp. 1168-1175, (2001).

Park et al., "Monodisperse Nanoparticles of Ni and NiO: Synthesis, Characterization, Self-Assembled Superlattices, and Catalytic Applications in the Suzuki Coupling Reaction," *Adv. Mater*, vol. 17, No. 4, pp. 429-434, (Feb. 23, 2005).

Hyeon et al., "Synthesis of Highly Crystalline and Monodisperse Maghemite Nanocrystallites Without a Size-Selection Process," *J. Am. Chem. Soc.*, vol. 123, No. 51, pp. 12798-12801, (2001).

Sun et al., "Monodisperse $MFe_2O_4$ (M=Fe, Co, Mn) Nanoparticles," *J. Am. Chem. Soc.*, vol. 126, No. 1, pp. 273-279, (2004).

Li et al., "Uniform Colloidal Spheres for $(Y_{1-x}Gd_x)_2O_3$ (x=0-1): Formation Mechanism, Compositional Impacts, and Physicochemical Properties of the Oxides," *Chem. Mater.*, vol. 20, No. 6, pp. 2274-2281, (2008).

Notice Requesting Submission of Opinion for Korean Patent Appl. No. 10-2008-0112658 mailed Dec. 30, 2010 (with English translation).

* cited by examiner

1 day 10 days 20 days 30 days

MAGNETIC NANOPARTICLES SURFACE-MODIFIED WITH DITHIOCARBAMATE

BACKGROUND

The present technology relates in general to nano-sized solid support systems. In particular, the technology relates to nano-sized solid support systems for use in organic synthesis.

SUMMARY

In one aspect, a surface-modified, magnetic nanoparticle including one or more multi-dentate ligands bound to a surface of a magnetic nanoparticle, is provided. In one embodiment, the one or more multi-dentate ligands are bound to the surface of the magnetic nanoparticle through two or more dithiocarbamate groups. In another embodiment, the molar ratio of dithiocarbamate groups to amine groups in the multi-dentate ligand is about 1:9 to 9:1. In another embodiment, the one or more multi-dentate ligands are bound to the surface of the magnetic nanoparticle through at least three dithiocarbamate groups.

In another embodiment, the one or more multi-dentate ligands are an oligomeric compound of Formula II:

$$R_2NCH_2[CH_2NR'CH_2]_m[CH_2N(CS_2^-)CH_2]_q [CH_2NHCH_2]_rCH_2NR''_2 \quad (II)$$

each R, R', and R" are independently H, a branched ethyleneimine unit, an unsubstituted or substituted alkyl, an unsubstituted or substituted alkenyl, or an unsubstituted or substituted aryl; m is an integer from 0 to about 49; q is an integer from 1 to about 50; r is an integer from 0 to about 49; the sum of m, q, and r is less than or equal to about 50; and the $[CH_2N(CS_2H)CH_2]_q$ units are distributed randomly throughout the oligomer. The oligomeric compound of Formula II is derived from a polyethyleneimine that can be either linear or branched.

In another embodiment, the magnetic nanoparticle is $\gamma\text{-}Fe_2O_3$; Co; FePt alloy; $MFe_2O_4$ where M is Fe, Co, Mn, or a mixture of any two or more thereof; FePd; CoPd; $Mn_3O_4$; MnO; Ni; $(Y_{1-x}Gd_x)_2O_3$ where x is 0 or 1; iron-55-nickel-45 alloy; iron nickel oxide; nickel cobalt oxide; gadolinium(III) oxide; nickel zinc iron oxide; copper zinc iron oxide; copper iron oxide; iron oxide nanopowder; cobalt(II, III) oxide; nickel(II) oxide; or a mixture of any two or more thereof. In some embodiments, the surface modified magnetic nanoparticle further including a catalyst.

In another aspect, a process of preparing a surface-modified magnetic nanoparticle is provided including providing a magnetic nanoparticle complexed with one or more mono-dentate ligands; and exchanging the mono-dentate ligand with one or more multi-dentate ligands. In some embodiments, the one or more mono-dentate ligands have a lower binding constant with the magnetic nanoparticle than the binding constant of the one or more multi-dentate ligands for the magnetic nanoparticle. In other embodiment, the one or more mono-dentate ligands are an unsubstituted or substituted $C_1$—$C_{22}$ alkyl carboxylic acid, an unsubstituted or substituted polyalkylene glycol carboxylic acid, or a mixture of any two or more thereof. In some embodiments of the process, the one or more multi-dentate ligands are compounds of Formula II.

In another aspect, a support for solid phase synthesis is provided including a surface-modified magnetic nanoparticle including one or more multi-dentate ligands bound to a surface of a magnetic nanoparticle. In some embodiments, the one or more multi-dentate ligands are bound to the surface of the magnetic nanoparticle through two or more dithiocarbamate groups. In other embodiments, the one or more multi-dentate ligands are a compound of Formula II. In some embodiments, the one or more multi-dentate ligands are bound to the surface of the magnetic nanoparticle through at least three dithiocarbamate groups. In other embodiments, the magnetic nanoparticle is $\gamma\text{-}Fe_2O_3$; Co; FePt alloy; $MFe_2O_4$ where M is Fe, Co, Mn, or a mixture of any two or more thereof; FePd; CoPd; $Mn_3O_4$; MnO; Ni; $(Y_{1-x}Gd_x)_2O_3$ where x is 0 or 1; iron-55-nickel-45 alloy; iron nickel oxide; nickel cobalt oxide; gadolinium(III) oxide; nickel zinc iron oxide; copper zinc iron oxide; copper iron oxide; iron oxide nanopowder; cobalt(II, III) oxide; nickel(II) oxide; or a mixture of any two or more thereof. In yet other embodiments of the support for solid phase synthesis, the surface-modified magnetic nanoparticle further includes a catalyst. In yet other embodiments, the support is configured for use in solid state peptide synthesis.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Definitions

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed invention. Additionally the phrase "consisting essentially of" will be understood to include those elements specifically recited and those additional elements that do not materially affect the basic and novel characteristics of the claimed invention. The phrase "consisting of" excludes any element not specifically specified.

As used herein, the phrase "solid state reaction" refers to true solid state reactions and heterogeneous reactions, or at least quasi-homogeneous reactions.

As used herein, a "true solid state reaction" is a reaction in which all reactants are present in a phase of matter that exists below the melting point of each of the reactants at all points during the reaction.

As used herein, a "heterogeneous reaction" is a reaction that takes place with more than a single phase of matter present at the same time, such as a liquid with a solid or a gas with a solid or a liquid with a gas. Plasma phases are also possible.

As used herein, a "homogeneous reaction" is a reaction in which all reactants are of the same phase of matter—solid, liquid, gas, or plasma—or all reactants are dissolved in a liquid medium in which the reaction proceeds.

As used herein, a "quasi-homogeneous reaction" is a reaction that takes place between two or more reactants where at least one of the reactants approximates a phase of matter that is not the same as the other reactants, or a reactant approximates dissolution in a liquid in which the other reactant are fully soluble (i.e. the catalyst, though heterogeneous, acts as a homogeneous catalyst). For example, where a material is partially solvated and homogeneously dispersed in the solution, but is still a solid material, or has solid or undissolved segments, the material is said to be quasi-homogeneous with the solution in which it is at least partially solvated and homogeneously dispersed.

In general, "substituted" refers to a group, as defined below (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls(oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Alkyl groups include straight chain and branched alkyl groups having from 1 to 20 carbon atoms or, in some embodiments, from 1 to 12, 1 to 8, 1 to 6, or 1 to 4 carbon atoms. Alkyl groups further include cycloalkyl groups. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. Where the term haloalkyl is used, the alkyl group is substituted with one or more halogen atoms.

Alkenyl groups include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Cycloalkylalkyl groups are alkyl groups as defined above in which a hydrogen or carbon bond of an alkyl group is replaced with a bond to a cycloalkyl group as defined above. In some embodiments, cycloalkylalkyl groups have from 4 to 20 carbon atoms, 4 to 16 carbon atoms, and typically 4 to 10 carbon atoms. Substituted cycloalkylalkyl groups may be substituted at the alkyl, the cycloalkyl or both the alkyl and cycloalkyl portions of the group. Representative substituted cycloalkylalkyl groups may be mono-substituted or substituted more than once, such as, but not limited to, mono-, di- or tri-substituted with substituents such as those listed above.

Alkenyl groups include straight and branched chain and cycloalkyl groups as defined above, except that at least one double bond exists between two carbon atoms. Thus, alkenyl groups have from 2 to about 20 carbon atoms, and typically from 2 to 12 carbons or, in some embodiments, from 2 to 8, 2 to 6, or 2 to 4 carbon atoms. In some embodiments, alkenyl groups include cycloalkenyl groups having from 4 to 20 carbon atoms, 5 to 20 carbon atoms, 5 to 10 carbon atoms, or even 5, 6, 7, or 8 carbon atoms. Examples include, but are not limited to vinyl, allyl, CH=CH(CH$_3$), CH=C(CH$_3$)$_2$, —C(CH$_3$)=CH$_2$, —C(CH$_3$)=CH(CH$_3$), —C(CH$_2$CH$_3$) =CH$_2$, cyclohexenyl, cyclopentenyl, cyclohexadienyl, butadienyl, pentadienyl, and hexadienyl, among others. Representative substituted alkenyl groups may be mono-substituted or substituted more than once, such as, but not limited to, mono-, di- or tri-substituted with substituents such as those listed above.

Cycloalkenylalkyl groups are alkyl groups as defined above in which a hydrogen or carbon bond of the alkyl group is replaced with a bond to a cycloalkenyl group as defined above. Substituted cycloalkylalkenyl groups may be substituted at the alkyl, the cycloalkenyl or both the alkyl and cycloalkenyl portions of the group. Representative substituted cycloalkenylalkyl groups may be substituted one or more times with substituents such as those listed above.

Alkynyl groups include straight and branched chain alkyl groups, except that at least one triple bond exists between two carbon atoms. Thus, alkynyl groups have from 2 to about 20 carbon atoms, and typically from 2 to 12 carbons or, in some embodiments, from 2 to 8, 2 to 6, or 2 to 4 carbon atoms. Examples include, but are not limited to —C≡CH, —C≡C (CH$_3$), —C≡—C(CH$_2$CH$_3$), —CH$_2$C≡CH, —CH$_2$C≡C (CH$_3$), and —CH$_2$C≡C(CH$_2$CH$_3$), among others. Representative substituted alkynyl groups may be mono-substituted or substituted more than once, such as, but not limited to, mono-, di- or tri-substituted with substituents such as those listed above.

Aryl groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 20 carbon atoms, 7 to 14 carbon atoms or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-ethyl-indanyl. Representative substituted aralkyl groups may be substituted one or more times with substituents such as those listed above.

Heterocyclyl groups include aromatic (also referred to as heteroaryl) and non-aromatic ring compounds containing 3 or more ring members, of which one or more is a heteroatom such as, but not limited to, N, O, and S. In some embodiments, heterocyclyl groups include 3 to 20 ring members, whereas other such groups have 3 to 6, 3 to 10, 3 to 12, or 3 to 15 ring members. Heterocyclyl groups encompass unsaturated, partially saturated and saturated ring systems, such as, for example, imidazolyl, imidazolinyl and imidazolidinyl groups. The phrase "heterocyclyl group" includes fused ring species including those including fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclyl groups that have other groups, such as alkyl, oxo or halo groups, bonded to one of the ring members. Rather, these are referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthalenyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridyl, pyridazinyl, pyrimidinyl, pyrazinyl, thiophenyl, benzothiophenyl, furanyl, benzofuranyl, indolyl, azaindolyl (pyrrolopyridyl), indazolyl, benzimidazolyl, imidazopyridyl (azabenzimidazolyl), pyrazolopyridyl, triazolopyridyl, benzotriazolyl, benzoxazolyl, benzothiazolyl, benzothiadiazolyl, imidazopyridyl, isoxazolopyridyl, thianaphthalenyl, purinyl, xanthinyl, adeninyl, guaninyl, quinolinyl, isoquinolinyl, tetrahydroquinolinyl, quinoxalinyl, and quinazolinyl groups. Although the phrase "heteroaryl groups" includes fused ring compounds such as indolyl and 2,3-dihydro indolyl, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Heterocyclylalkyl groups are alkyl groups as defined above in which a hydrogen or carbon bond of an alkyl group is replaced with a bond to a heterocyclyl group as defined above. Substituted heterocyclylalkyl groups may be substituted at the alkyl, the heterocyclyl or both the alkyl and heterocyclyl portions of the group. Representative heterocyclyl alkyl groups include, but are not limited to, 4-ethyl-morpholinyl, 4-propylmorpholinyl, furan-2-yl methyl, furan-3-yl methyl, pyridine-3-yl methyl, tetrahydrofuran-2-yl ethyl, and indol-2-yl propyl. Representative substituted heterocyclylalkyl groups may be substituted one or more times with substituents such as those listed above.

Heteroaralkyl groups are alkyl groups as defined above in which a hydrogen or carbon bond of an alkyl group is replaced with a bond to a heteroaryl group as defined above. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

As used herein, halogen can refer to F, Cl, Br, or I.

As used herein, ammonium, or quaternary amine, refers to groups or ions having the following structure, $^{+NR^a}R^bR^cR^d$, where $R^a$, $R^b$, $R^c$, and $R^d$ are independently selected from H and alkyl groups. Thus, all of the $R^{a-d}$ groups may be the same or different. Alkyl ammonium refers to ammonium groups having one, two, three, or four alkyl groups, while tetralkylammonium refers to ammonium groups having four alkyl groups. Mixed alkyl ammoniums are those ammonium having two, three, or four alkyl groups where at least one of the alkyl groups is different from the other alkyl groups.

As used herein, polyalkylene glycol refers to groups having the following structure $R—((CH_2)_{n'}—O)_{m'}—$ where n' and m' are integers and R is a substituted or unsubstituted alkyl, alkenyl, alkynyl, or aryl groups. Examples of polyalkylene glycol include, but are not limited to polyethylene glycol, polypropylene glycol, polybutylene glycol, and others.

Multi-Dentate Ligand Compositions, Preparation and Use Thereof

Multi-dentate ligands complexed to magnetic nanoparticles are described herein, as well as methods of their preparation and use. Such complexes where the surface of the magnetic nanoparticle is bound to the multi-dentate ligand(s) may be referred to as "surface modified magnetic nanoparticles." While the complexes are solid state, in that the nanoparticle itself is not soluble, the multi-dentate ligands, in combination with the nano-scale size of the magnetic nanoparticle, allow for the complexes become quasi-homogeneous with a solvent of choice. Such complexes may be readily removed from a reaction mixture due their magnetic properties. Such magnetic nanoparticle supported catalysts may be used in solid state reactions.

Complexes of multi-dentate ligands with magnetic nanoparticles have the capability of providing a variety of advantages over conventional catalysts. Some advantages include that fact that the nano-scale size of the particles can enhance the reactivity of the catalysts, the magnetic properties can make the isolation and purification of product streams a facile process, and multiple reaction sequences in peptide synthesis and/or combination chemical synthesis can be automated with designed electromagnets.

In one aspect, a magnetic nanoparticle having at least one multi-dentate ligand is provided. The multi-dentate ligand(s) form a scaffold on which other organic moieties or functionalities may then be attached. The multi-dentate ligand may aid in increasing the solubility of a magnetic nanoparticle complexed with the multi-dentate ligand and/or provide solubilizing groups for readily suspending the magnetic nanoparticle in solution in a quasi-homogeneous fashion. A catalytic material may be incorporated into the magnetic nanoparticle that is then complexed by the multi-dentate ligand(s). Alternatively, or additionally, functionality on the multi-dentate ligand may provide a binding moiety for binding a catalyst that is then supported by the magnetic nanoparticle complexed with the multi-dentate ligand. In some embodiments, a catalytic material is incorporated into the magnetic nanoparticle. In other embodiments, a catalytic material is attached to a functional group on the multi-dentate ligand. Independent of how a catalytic material is associated with a magnetic nanoparticle, the catalytic material may then be used as a heterogeneous, or quasi-homogeneous, catalyst for any of a number of reactions, and subsequently removed from the reaction medium with the application of a magnetic field.

In some embodiments, the multi-dentate ligands, in their uncomplexed form, are polyethyleneimines with dithioic acid (—C(S)SH) moieties. Such compounds are structurally represented by Formula I:

$$R_2NCH_2[CH_2NR'CH_2]_m[CH_2N(CS_2H)CH_2]_q \\ [CH_2NHCH_2]_rCH_2NR''_2 \quad (I)$$

Where each R, R', and R" are independently H, a branched ethyleneimine unit, an unsubstituted or substituted alkyl, an unsubstituted or substituted alkenyl, or an unsubstituted or substituted aryl, m is an integer from 0 to about 49, q is an integer from 1 to about 50, r is an integer from 0 to about 49, the sum of m, q, and r is less than or equal to about 50, and the $[CH_2N(CS_2H)CH_2]_q$ units are distributed randomly throughout the oligomer. Molecular weights of the polyethyleneimine compounds may range from about 250 g/mol to 12,500 g/mol. Upon complexation to a metal or particulate surface, the hydrogen on the dithioic acid moiety is displaced to form a dithiocarbamate (DTC) moiety ($NCS_2^-$) that coordinates to the metal or particle. Once the hydrogen atoms are displaced from the dithioic acid groups, the ligand is an anion of Formula (II):

$$R_2NCH_2[CH_2NR'CH_2]_m[CH_2N^-(CS_2^-)CH_2]_q \\ [CH_2NHCH_2]_rCH_2NR''_2 \quad (II).$$

where m is an integer from 0 to about 49, q is an integer from 1 to about 50, r is an integer from 0 to about 49, the sum of m, q, and r is less than or equal to about 50, and the $[CH_2N(CS_2^-)CH_2]_q$ units are distributed randomly throughout the oligomer.

The multi-dentate ligands Formula I are prepared from oligomeric polyethyleneimines of The multi-dentate ligands Formula I are prepared from linear or branched oligomeric polyethyleneimines of Formula III:

$$R_2NCH_2[CH_2NR'CH_2]_nCH_2NR''_2 \quad (III)$$

and an appropriate amount of carbon disulfide ($CS_2$). In Formula III, each R, R' and R' are independently H, a branched ethyleneimine unit, an unsubstituted or substituted alkyl, an unsubstituted or substituted alkenyl, or an unsubstituted or substituted aryl; and n is an integer from 1 to about 50. In some embodiments, n is an integer from 1 to about 50, from 5 to about 50, in other embodiments, and from 10 to about 50, in yet other embodiments. The total amount of $CS_2$ used is less than a stoichiometric amount based upon the number of amine groups in the oligomeric polyethyleneimine. Only a fraction of the amine groups internal to the polyethyleneimine react with the $CS_2$. Secondary amines are known to have a higher reactivity with $CS_2$, via an $S_N2$-type reaction.

Scheme I is an exemplary overall representation of the process of functionalization of polyethyleneimines, where n is from about 1 to about 50, m is from 0 to about 49, r is from 0 to about 49 and q is from 1 to about 50, n is equal to the sum of m, q, and r, and further where the $CH_2N(CS_2^-)CH_2$ group is distributed randomly in the polyethyleneimine.

Scheme I

The molar ratio of dithiocarbamate groups to amine groups ($-NH_2$) in the multi-dentate polyethyleneimine compounds can also have an impact the binding to nanoparticles, and therefore, the use of nanoparticles complexed with the polyethyleneimine compound as a support for solid phase synthesis. For example, if too few dithiocarbamate groups are incorporated into the ligand, the binding of the ligand to the nanoparticle may be compromised. If too many dithiocarbamate groups are incorporated into the ligand, the binding of the ligand to the nanoparticle may not allow for conformational changes or may aggregate to many nanoparticles. In some embodiments, the molar ratio of dithiocarbamate functionality to amine functionality ranges from about 1:9 to 9:1.

Magnetic nanoparticles that may be complexed with the multi-dentate ligands include those that will react with either amine or dithiocarbamate groups. Magnetic nanoparticles include, but are not limited to those made of $\gamma$-$Fe_2O_3$, Co, FePt alloy, $MFe_2O_4$ where M is Fe, Co, or Mn, FePd, CoPd, $Mn_3O_4$, MnO, Ni, $(Y_{1-x}Gd_x)_2O_3$ where x is zero or one, iron55-nickel45 alloy, iron nickel oxide, nickel cobalt oxide, gadolinium(III) oxide, nickel zinc iron oxide, copper zinc iron oxide, copper iron oxide, iron oxide nanopowder, cobalt (II, III) oxide, and nickel(II) oxide. Some the above materials are variously known from T. Hyeon *Chem. Comm.* 2003, 927; *J Appl. Phys.* 1999, 85, 4325; *Science* 2000, 287, 1989; *J. Am. Chem. Soc.* 2001, 123, 12798; $MFe_2O_4$ (M=Fe, Co, Mn), *J. Phys. Chem. B* 2001, 105, 1168; *J Am. Chem. Soc.* 2004, 126, 273; *J. Appl. Phys.* 2002, 91, 8477; *Angew. Chem. Int. Ed* 2004, 43, 1115; *Adv. Mater.* 2005, 17, 429; and *Chem. Mater.* 2008, 20, 2274.

Multi-dentate ligands as solid supports in magnetic nanoparticles applications have a number of advantages over their heterogeneous, or polymer-supported analogs, particularly in the area of solid state peptide synthesis applications. In such solid state peptide synthesis, micron-size solid polymeric (e.g. polystyrene) beads, insoluble yet porous, are typically treated with functional units (i.e. linkers) on which peptide chains can be built. The peptide remains covalently attached to the bead until cleaved from it by a reagent. The peptide is thus immobilized on the solid-phase and can be retained during a filtration process, whereas liquid-phase reagents and by-products of synthesis are flushed away. However, during this process, polymer supports tend to swell, causing reactants such as monomers or amino acids and peptides to be trapped within the polymer matrix, instead of reacting with the catalyst. Thus, the trapped molecules then may be rinsed into solution upon purification, causing contamination or impurities within the product stream. However, catalysts supported with the magnetic nanoparticles having multi-dentate ligands, do not have the large matrix structure of a polymer, thus inclusion and trapping of monomers, amino acids, or peptides is eliminated, or at least is reduced, as compared to the polymer supported catalysts. Increased reactivity rates and efficiencies of solid phase organic reactions may be achieved due to the large increase in catalytic surface area as a result of the nanoparticulate size when compared to micron- or other bulk-size catalytic surfaces.

As eluded to above, the multi-dentate ligands can provide organic or ionic groups that will aid in increasing the solubility of the magnetic nanoparticles, essentially allowing the particle to be dragged in solution or at least achieve a quasi-homogeneous phase of the nanoparticle complex in solution. Such a "quasi-homogeneous" heterogeneous catalyst will have increased surface area and hence greater reactivity with reactants. This will allow heterogeneous catalytic processes to be performed that may otherwise to be too slow to proceed on larger surfaces.

The magnetic nanoparticles, modified with the multi-dentate ligands can expand the availability of organic reactions in solid phase reactions, such as reactions with homogeneous and heterogeneous catalysts. For example, some potentially catalyzed reactions are either too slow or non-existent due to particle size or solution phase dynamics. The magnetic nanoparticles with multi-dentate ligands can overcome such effects by greatly reducing the catalytic particle size to the nano-scale, thereby increasing the surface area of the catalysts, and also by approximating a solution phase catalyst system that may otherwise be unachievable.

There is no particular limit to the types of catalysts that may be supported by the surface-modified magnetic nanoparticles. The catalyst is capable of being incorporated into the nanoparticle itself as a particle or as part of an alloy in the nanoparticle, or the catalyst is capable of binding to the multi-dentate ligand or a coordinating moiety that is bound to the multi-dentate ligand. Catalysts can include any of the transition metal or main group metal catalysts. For example, catalysts of, or containing, Ti, Zr, V, Nb, Ta, Cr, Mo, W, Mn, Re, Fe, Ru, Os, Co, Rh, Ir, Ni, Pd, Pt, Cu, Ag, Au, Zn, Cd, Hg, B, Al, Ge, Sn, Pb, P, As, Sb, Bi, the lanthanides, and/or the actinides. Such catalysts may be those used in hydrogenations, hydroformylations, oxidations, nitrations, epoxidations, living polymerization, Fischer-Trospch processes, peptide and amino acid syntheses, coupling reactions, rearrangement reactions, and other reactions that utilize catalysis.

Surface-modified magnetic nanoparticles complexed with the multi-dentate ligands may be prepared via a ligand exchange, or metathesis, reaction with a magnetic nanoparticle having displaceable ligands. The displaceable ligands are either mono-dentate ligands or have a binding constant with the magnetic nanoparticle that is less than the binding constant of the dithiocarbamate group of the multi-dentate ligands. In some embodiments, the displaceable ligands are $C_1$-$C_{22}$ alkyl carboxylic acids, polyalkylene glycol carboxylic acids, and other groups known to those of skill in the art. In such metathesis reactions, the mono-dentate ligand coordinate nanoparticles are dissolved or suspended in a solution containing the multi-dentate ligands. Then, for example, by either stirring, heating, or a combination of stirring and heating, the mono-dentate ligand is displaced in favor of the multi-dentate ligand, with the mono-dentate ligand being dissolved in the solution. The multi-dentate ligand coordinated nanoparticles may then be isolated from the solution/suspension.

The preparation method of the nanoparticles may be accomplished via thermal decomposition or co-precipitation methods known to those of skill in the art.

As the multi-dentate ligands of Formulas I and II bind to the surface of a magnetic nanoparticle, the surface is modified. However, unlike most mono-dentate organic acid ligands, or surfactants such as stearic acid and oleic acid, the multi-dentate ligands allow the magnetic nanoparticles to remain dispersible within the solution, without employing an excess amount of ligand or surfactants. Scheme II is an illustration of a nanoparticle having mono-dentate carboxylate groups reacting with a multi-dentate ligand. The mono-dentate carboxylate group is displaced, and the multi-dentate ligand binds to the nanoparticle.

Scheme II:

It will be noted, that upon interacting with the nanoparticle, not all of the amine functionality of the multi-dentate ligand is bound to the nanoparticle, but rather both some primary and secondary amine groups remain uncomplexed with regard to the nanoparticle. The amine groups that do not bind to the magnetic nanoparticle may be functionalized via other reactions to introduce additional functionality. The additional functionality can impart a variety of properties to the nanoparticle, including the ability to make the coordinated nanoparticle compatible with or soluble in a variety of other media. For example, uncomplexed amine groups may be reacted other organic groups as illustrated in Scheme III, to form amines and quaternary amines.

Scheme III:

In some embodiments, the reaction with the uncomplexed amine is with an RX group where R is a substituted or unsubstituted alkyl group, a substituted or unsubstituted alkenyl group, a substituted or unsubstituted alkynyl group, a substituted or unsubstituted aralkyl group, a substituted or unsubstituted cycloalkyl group, a substituted or unsubstituted heteroaralkyl group, a substituted or unsubstituted heterocyclylalkyl group, a substituted or unsubstituted cycloalkylalkyl group, or a substituted or unsubstituted cycloalkenylalkyl group, and X is a halogen. In some embodiments, R adds solubilizing functionality to the multi-dentate ligand complexed nanoparticle. In other embodiments, R has coordinating functionality to bind other groups or metals that may impart catalytic or other properties to the nanoparticle complex.

In some embodiments, the uncomplexed amine groups can be further functionalized in subsequent reactions. For example, the amines may react with amino acids in peptide synthesis, with phosphoamidite groups in oligonuleotide synthesis, or with any building molecular units in combinatorial chemical synthesis.

The magnetic nanoparticles allow for the facile separation of the catalyst from a product stream. In some embodiments, after a catalytic reaction in a reactor is complete, external to the reaction, a magnetic field is applied causing the magnetic nanoparticles to migrate to, for example, an interior surface of the reactor. The product may then be decanted, or otherwise separated, from the nanoparticles resulting in a clean and quick isolation procedure. Such a procedure may be applied to multi-step synthetic procedures in which reactionary intermediates may require multiple different catalysts. For example, a first step of a reaction may be run with one catalyst in a first vessel, the catalyst is then isolated to the vessel wall via application of a magnetic field, the intermediary product is then decanted to a second vessel with a second catalyst. Multiple flow systems, vessels, catalysts, and magnetic field can be used in large scale chemical syntheses. For example, a magnetic field may be used to retain the magnetic nanoparticles within a fluid flow reaction system, allowing reactants to pass through, or the particles may be released at any time or sequestered at any time in the reaction system or during reactant flow.

Magnetic nanoparticles complexed with multi-dentate ligands may be used in combinatorial synthesis, or with hydrogenation catalysts such as platinum. In some embodiments, an active platinum catalyst is alloyed with or combined with a magnetic material to form a platinum-containing nanoparticle that may be used in catalytic hydrogenation. In other embodiments, a platinum catalyst is supported by a multi-dentate ligand complexed magnetic nanoparticle. In such other embodiment, the platinum catalyst is attached to the multi-dentate ligand via organic coordination groups.

Due to the magnetic nature of the catalysts, isolation and purification steps are greatly enhanced. For example, upon completion of the reaction, a magnetic field may be applied, thus sequestering the magnetic nanoparticles near the magnet source, and allowing for ready separation of the product stream. Such procedures can accommodate multi-step reactions or multiple uses of the same magnetic nanoparticulate catalysts. The magnetic nanoparticles complexed with multi-dentate ligands can also accommodate multiple reaction sequences in peptide synthesis or combinatory chemical synthesis, and the processes can be automated with designed electromagnets.

The present embodiments, thus generally described, will be understood more readily by reference to the following examples, which are provided by way of illustration and are not intended to be limiting of the present technology in any way.

EXAMPLES

Example 1

Preparation of DETA-DTC$_3$

DETA (diethylenetriamine; 0.5 g, 4.8 mmol) was added to a NaOH (1.72 g, 44 mmol) solution in EtOH (50 ml) and H$_2$O (10 ml) at room temperature. CS$_2$ (9.07 ml, 0.12 mol) was then slowly added to the solution. After 2 hr, the reaction mixture was dried in vacuo to give a slightly yellow solid product of DETA-DTC$_3$. $^1$H NMR (ppm, in D$_2$O): 4.34 (t, 4H), 3.91 (t, 4H).

Example 2

Preparation of DETA-DTC

DETA (0.2 g, 2 mmol) was dissolved in 40-50 ml EtOH at 0° C., and a solution of CS$_2$ (1 mmol) in EtOH (10 ml) was slowly added. After stirring for 10 min at 0° C., a white precipitate of DETA-DTC was obtained by filtration, and washed with EtOH several times before drying in vacuo. $^1$H NMR (ppm, in D$_2$O): 4.31 (t, 4H), 3.24 (t, 4H).

Example 3

Preparation of TEPA-DTC

TEPA (tetraethylenepentamine; 0.37 g, 2 mmol) was dissolved in 40-50 ml EtOH at 0° C., and a solution of CS$_2$ (1 mmol) in EtOH (10 ml) was slowly added. After stirring for 10 min at 0° C., a white precipitate of TEPA-DTC was obtained by filtration, and washed with EtOH several times before drying in vacuo. $^1$H NMR (ppm, in D$_2$O): 4.35-4.15 (b, —CH$_2$—N(CS$_2$)—), 3.2-2.5 (b, —CH$_2$—NH— or —CH$_2$—NH$_2$—).

Example 4

Preparation of PEI-DTC

PEI (polyethyleneimine; 0.423 g) was dissolved in 40-50 ml EtOH at 0° C., and a solution of CS$_2$ (1 mmol) in EtOH (10 ml) was slowly added. After stirring for 10 min at 0° C., a yellow precipitate of PEI-DTC was obtained by filtration, and washed with EtOH several times before drying in vacuo. In the PEI-DTC, the dithiocarbamate and ammonium groups may be positioned along the oligomer backbone randomly. $^1$H NMR (ppm, in D$_2$O): 4.35-4.15 (b, —CH$_2$—N(CS$_2$)—), 3.2-2.5 (b, —CH$_2$—NH— or —CH$_2$—NH$_2$—).

Figure 1:
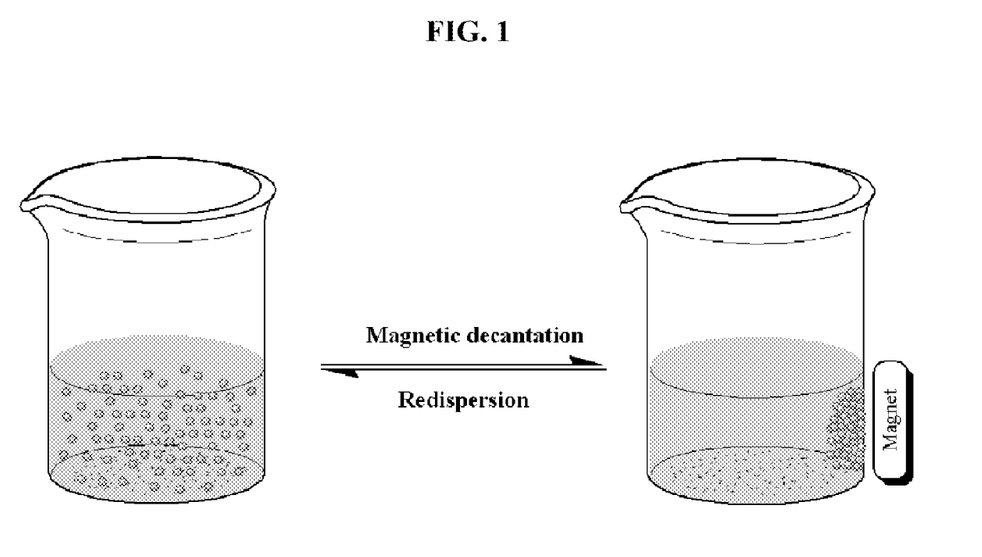
FIG. 1 is a drawing of an illustrative embodiment of separation of a magnetic nanoparticle with a multi-dentate ligand from a reaction medium via magnetic decantation.
Figure 2:
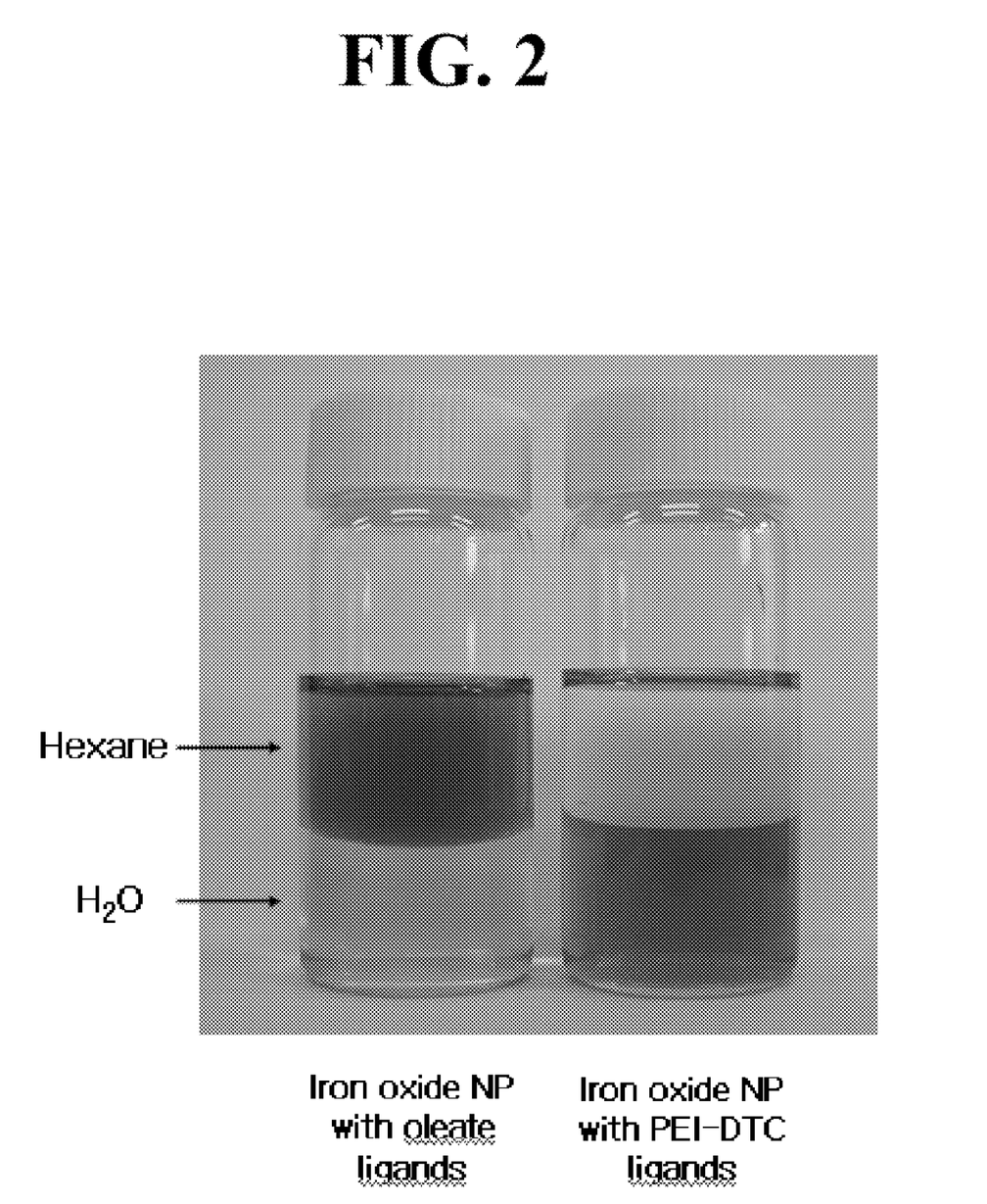
FIG. 2 is a photograph showing illustrative embodiments of two samples of iron oxidepolyethyleneimine (PEI)-dithiocarbamate (DTC) nanoparticles dispersed in water and hexane, with the sample on the left showing the starting iron oxide oleate material in the hexane phase and the sample on the right showing the iron oxide—PEI-DTC in the aqueous phase.

Example 5 Ligand exchange reaction of iron oxide with dithiocarbamate ligands. Tetrabutylammonium hydroxide (TBAH) and TEPA-DTC or PEI-DTC (100 mg) was dissolved in THF (2 ml). To this solution, iron oxide nanoparticles (2 mg, oleate over-coated iron oxide prepared by thermolysis of Fe(oleate)$_2$) in THF (2 ml) was added. The mixture was centrifuged at 15,000 rpm for 10 min (4 times), using THF to remove the oleate ligand and excess amounts of TEPA-DTC or PEI-DTC. The surface exchanged iron oxide nanoparticles may be dispersed and stored in H$_2$O (see FIG. 2). The clearness of dispersed water solution of Fe$_3$O$_4$—PEI-DTC nanoparticles can be maintained for extended periods.

Figure 3:
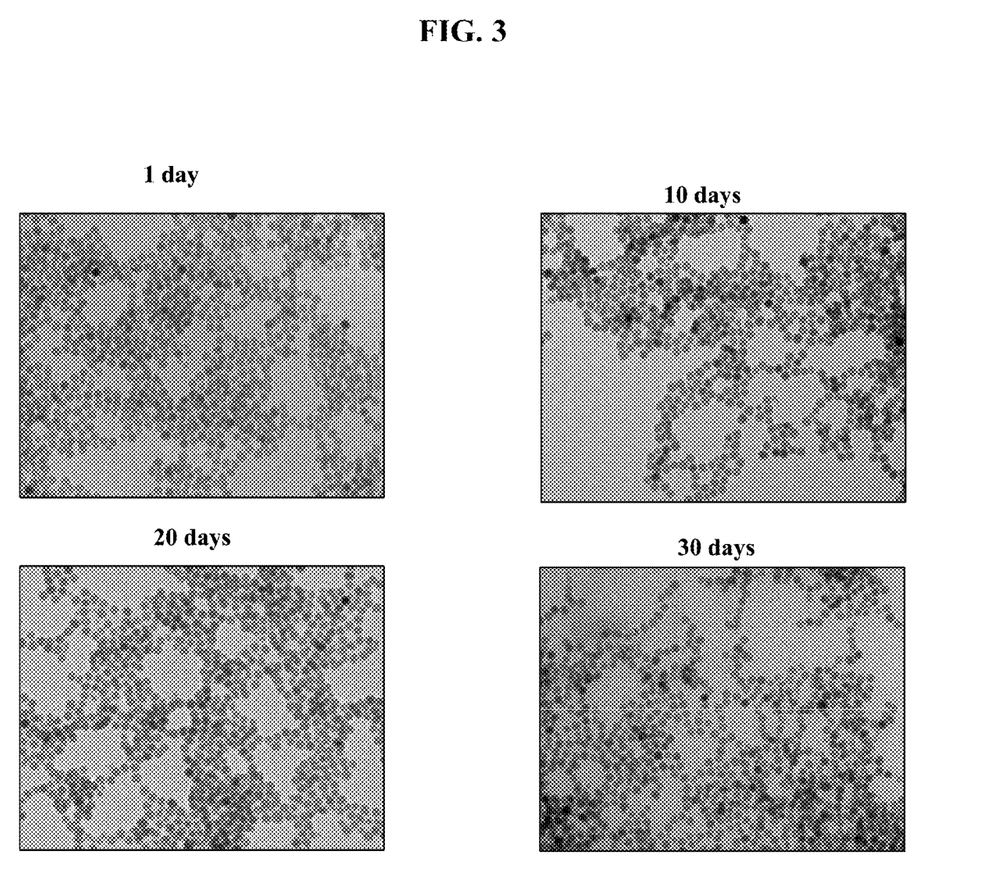
FIG. 3 are tunneling electron micrographs of a sample of PEI-DTC over time.

As shown in FIG. 3, tunneling electron micrographs of the magnetic nanoparticulate complexes do not show significant differences in the images over time. This is an indication of the stability of the complexes and the ability to regenerate the complexes after use. FIG. 3 provides data to 30 days, yet subsequent real-time tests show stability to be in excess of ten months with little or no change.

EQUIVALENTS

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A surface-modified, magnetic nanoparticle comprising one or more multi-dentate ligands comprising two or more dithiocarbamate groups and the one or more multi-dentate ligands are bound through two or more dithiocarbamate groups to a surface of a magnetic nanoparticle.

2. The surface modified magnetic nanoparticle of claim 1, wherein the one or more multi-dentate ligands further comprise one or more amine groups and a molar ratio of dithiocarbamate groups to amine groups in the multi-dentate ligand is about 1:9 to 9:1.

3. The surface-modified magnetic nanoparticle of claim 1, wherein the one or more multi-dentate ligands are bound to the surface of the magnetic nanoparticle through at least three dithiocarbamate groups.

4. The surface-modified magnetic nanoparticle of claim 1, wherein:
the one or more multi-dentate ligands are an oligomeric compound of Formula II:

(II)

each R, R', and R" are independently H, a branched ethyleneimine unit, an unsubstituted or substituted alkyl, an unsubstituted or substituted alkenyl, or an unsubstituted or substituted aryl;
m is an integer from 0 to about 49,
q is an integer from 2 to about 50,
r is an integer from 0 to about 49,
$m+q+r \leq 50$; and
the $[CH_2N(CS_2H)CH_2]_q$ units are distributed randomly throughout the oligomer.

5. The surface modified magnetic nanoparticle of claim 1, wherein the magnetic nanoparticle is $\gamma$-$Fe_2O_3$; Co; FePt alloy; $MFe_2O_4$ wherein M is Fe, Co, Mn, or a mixture of any two or more thereof; FePd; CoPd; $Mn_3O_4$; MnO; Ni; $(Y_{i-x}Gd_x)_2O_3$ wherein x is 0 or 1; iron-55-nickel-45 alloy; iron nickel oxide; nickel cobalt oxide; gadolinium(III) oxide; nickel zinc iron oxide; copper zinc iron oxide; copper iron oxide; iron oxide nanopowder; cobalt(II, III) oxide; nickel(II) oxide; or a mixture of any two or more thereof.

6. The surface modified magnetic nanoparticle of claim 1, further comprising a catalyst.

7. A process of preparing a surface-modified magnetic nanoparticle comprising:
providing a magnetic nanoparticle complexed with one or more mono-dentate ligands; and
exchanging the mono-dentate ligand with one or more multi-dentate ligands;
wherein each of the one or more multi-dentate ligands complex to the magnetic nanoparticle via two or more dithiocarbamate groups.

8. The process of claim 7, wherein the one or more mono-dentate ligands have a lower binding constant with the magnetic nanoparticle than the binding constant of the one or more multi-dentate ligands for the magnetic nanoparticle.

9. The process of claim 7, wherein the one or more mono-dentate ligands are an unsubstituted or substituted $C_1$-$C_{22}$ alkyl carboxylic acid, an unsubstituted or substituted polyalkylene glycol carboxylic acid, or a mixture of any two or more thereof.

10. The process of claim 7, wherein the one or more multi-dentate ligands are oligomeric compounds of Formula II:

(II)

each R, R', and R" are independently H, a branched ethyleneimine unit, an unsubstituted or substituted alkyl, an unsubstituted or substituted alkenyl, or an unsubstituted or substituted aryl;
m is an integer from 0 to about 49,
q is an integer from 2 to about 50,
r is an integer from 0 to about 49,
$m+q+r \leq 50$; and
the $[CH_2N(CS_2H)CH_2]_q$ units are distributed randomly throughout the oligomer.

11. A support for solid phase synthesis comprising a surface-modified magnetic nanoparticle comprising one or more multi-dentate ligands, wherein the one or more multi-dentate ligands comprise two or more dithiocarbamate groups and the ligands are bound to a surface of a magnetic nanoparticle via two or more dithiocarbamate groups.

12. The support for solid phase synthesis of claim 11, wherein the one or more multi-dentate ligands are oligomeric compounds of Formula II:

(II)

each R, R', and R" are independently H, a branched ethyleneimine unit, an unsubstituted or substituted alkyl, an unsubstituted or substituted alkenyl, or an unsubstituted or substituted aryl;
m is an integer from 0 to about 49,
q is an integer from 2 to about 50,
r is an integer from 0 to about 49,
$m+q+r \leq 50$; and
the $[CH_2N(CS_2H)CH_2]_q$ units are distributed randomly throughout the oligomer.

13. The support for solid phase synthesis of claim 11, wherein the one or more multi-dentate ligands are bound to the surface of the magnetic nanoparticle through at least three dithiocarbamate groups.

14. The support for solid phase synthesis of claim 11, wherein the magnetic nanoparticle is $\gamma$-$Fe_2O_3$; Co; FePt alloy; $MFe_2O_4$ wherein M is Fe, Co, Mn, or a mixture of any two or more thereof; FePd; CoPd; $Mn_3O_4$; MnO; Ni; $(Y_{1-x}Gd_x)_2O_3$ wherein x is 0 or 1; iron-55-nickel-45 alloy; iron nickel oxide; nickel cobalt oxide; gadolinium(III) oxide; nickel zinc iron oxide; copper zinc iron oxide; copper iron oxide; iron oxide nanopowder; cobalt(II, III) oxide; nickel(II) oxide; or a mixture of any two or more thereof.

15. The support for solid phase synthesis of claim 11, wherein the surface-modified magnetic nanoparticle further comprises a catalyst.

16. The support for solid phase synthesis of claim 11, wherein the support is configured for use in solid state peptide synthesis.

* * * * *

UNITED STATES PATENT AND TRADEMARK OFFICE
CERTIFICATE OF CORRECTION

PATENT NO.         : 8,043,702 B2
APPLICATION NO.    : 12/197568
DATED              : October 25, 2011
INVENTOR(S)        : Lee It is certified that error appears in the above-identified patent and that said Letters Patent is hereby corrected as shown below:

Title Page, Item (56), under "OTHER PUBLICATIONS", in Column 2, Line 3, delete "Reactionsin" and insert -- Reactions in --, therefor.

On Page 2, Item (56), under "OTHER PUBLICATIONS", in Column 1, Line 7, delete "Sperical" and insert -- Spherical --, therefor.

In Column 1, Line 47, delete "surface modified" and insert -- surface-modified --, therefor at each occurrence throughout the patent.

In Column 2, Line 33, delete "oxidepolyethyleneimine" and insert -- oxide-polyethyleneimine --, therefor.

In Column 2, Line 45, delete "hereof In" and insert -- hereof. In --, therefor.

In Column 5, Line 25, delete "—C≡—(CH$_2$CH$_3$)," and insert -- —C≡C(CH$_2$CH$_3$), --, therefor.

In Column 7, Line 26, delete "$^{+NR_a}R^bR^cR^d$," and insert -- $^+NR^aR^bR^cR^d$, --, therefor.

In Column 8, Line 42, in Formula (I), delete "[CH$_2$N$^-$(CS$_2^-$)CH$_2$]$_q$" and insert -- [CH$_2$N(CS$_2^-$)CH$_2$]$_q$ --, therefor.

In Column 8, Line 43, delete "(II)." and insert -- (II), --, therefor.

In Column 8, Line 56, delete "and R'''" and insert -- and R" --, therefor.

In Column 9, Line 46, delete "J Appl." and insert -- J. Appl. --, therefor.

In Column 9, Line 48, delete "J Am." and insert -- J. Am. --, therefor.

Signed and Sealed this
Twenty-fourth Day of April, 2012

David J. Kappos
*Director of the United States Patent and Trademark Office*